United States Patent
Takeda et al.

(10) Patent No.: US 10,411,265 B2
(45) Date of Patent: Sep. 10, 2019

(54) LITHIUM ION SECONDARY BATTERY AND METHOD OF MANUFACTURING SAME

(71) Applicant: TOYOTA JIDOSHA KABUSHIKI KAISHA, Toyota-shi, Aichi-ken (JP)

(72) Inventors: Kazuhisa Takeda, Toyota (JP); Keisuke Ohara, Nagoya (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 78 days.

(21) Appl. No.: 15/664,329

(22) Filed: Jul. 31, 2017

(65) Prior Publication Data
US 2018/0076462 A1 Mar. 15, 2018

(30) Foreign Application Priority Data

Sep. 15, 2016 (JP) .................................. 2016-180636

(51) Int. Cl.
| | |
|---|---|
| *H01M 4/62* | (2006.01) |
| *H01M 4/36* | (2006.01) |
| *H01M 4/587* | (2010.01) |
| *H01M 10/0525* | (2010.01) |
| *H01M 10/0568* | (2010.01) |
| *H01M 10/0569* | (2010.01) |

(52) U.S. Cl.
CPC .......... *H01M 4/624* (2013.01); *H01M 4/366* (2013.01); *H01M 4/587* (2013.01); *H01M 4/62* (2013.01); *H01M 10/0525* (2013.01); *H01M 10/0568* (2013.01); *H01M 10/0569* (2013.01); *H01M 2300/0037* (2013.01)

(58) Field of Classification Search
None
See application file for complete search history.

(56) References Cited

U.S. PATENT DOCUMENTS

| | | | | |
|---|---|---|---|---|
| 2009/0068562 | A1* | 3/2009 | Yew | H01M 4/485 429/231.5 |
| 2011/0244322 | A1* | 10/2011 | Hong | H01M 4/364 429/211 |
| 2017/0062871 | A1 | 3/2017 | Urata et al. | |

FOREIGN PATENT DOCUMENTS

| | | |
|---|---|---|
| JP | 11-204109 A | 7/1999 |
| JP | 2002-246020 A | 8/2002 |
| JP | 2007-103246 A | 4/2007 |
| JP | 2010-280551 A | 12/2010 |
| JP | 2013-218910 A | 10/2013 |
| JP | 2016-46204 A | 4/2016 |
| KR | 2000-0041563 A | 7/2000 |

(Continued)

OTHER PUBLICATIONS

Lee et al., "Self-assembled flower-like $TiO_2$ on exfoliated graphite oxide for heavy metal removal", Journal of Industrial and Engineering Chemistry, vol. 18, 2012, pp. 1178-1185.

*Primary Examiner* — Eli S Mekhlin
(74) *Attorney, Agent, or Firm* — Sughrue Mion, PLLC

(57) ABSTRACT

A lithium ion secondary battery includes a negative electrode, a positive electrode, and a non-aqueous electrolyte solution. The non-aqueous electrolyte solution includes a lithium salt and an aprotic solvent. The negative electrode includes a composite particle. The composite particle includes a negative electrode active material and tungsten trioxide. The negative electrode active material contains graphite. The tungsten trioxide is disposed on a surface of the negative electrode active material.

10 Claims, 5 Drawing Sheets

(56) References Cited

FOREIGN PATENT DOCUMENTS

| KR | 10-2016-0095549 A | 8/2016 |
|----|-------------------|--------|
| WO | 2015/129188 A1    | 9/2015 |

\* cited by examiner

LITHIUM ION SECONDARY BATTERY AND METHOD OF MANUFACTURING SAME

This nonprovisional application is based on Japanese Patent Application No. 2016-180636 filed on Sep. 15, 2016, with the Japan Patent Office, the entire contents of which are hereby incorporated by reference.

BACKGROUND

Field

The present disclosure relates to a lithium ion secondary battery and a method of manufacturing the same.

Description of the Background Art

WO2015/129188 discloses a configuration in which a negative electrode includes graphite (negative electrode active material) and tungsten trioxide ($WO_3$).

SUMMARY

According to WO2015/129188, since the $WO_3$ is added to the negative electrode, a covering film excellent in lithium ion diffusibility is formed on a surface of the negative electrode active material, thus improving a large-current charging/discharging characteristic of the lithium ion secondary battery. However, there is still room for improvement in the large-current charging/discharging characteristic of the lithium ion secondary battery.

Thus, an object of the present disclosure is to provide a lithium ion secondary battery having an improved large-current charging/discharging characteristic.

Hereinafter, the technical configuration and function and effect of the present disclosure will be described. However, the mechanism of the function of the present disclosure includes presumption. The scope of claims should not be limited depending on whether the mechanism of the function is correct or incorrect.

[1] A lithium ion secondary battery according to the present disclosure includes a negative electrode, a positive electrode, and a non-aqueous electrolyte solution. The non-aqueous electrolyte solution includes a lithium salt and an aprotic solvent. The negative electrode includes a composite particle. The composite particle includes a negative electrode active material and tungsten trioxide. The negative electrode active material contains graphite. The tungsten trioxide is disposed on a surface of the negative electrode active material.

In WO2015/129188, a negative electrode active material, $WO_3$, and a binder are mixed, thereby manufacturing a negative electrode (paragraph [0048] of WO2015/129188). In other words, the $WO_3$ is only dispersed in the negative electrode composite material, and is not disposed on the surface of the negative electrode active material. Also, the negative electrode active material and the $WO_3$ are not combined.

On the other hand, the lithium ion secondary battery of the present disclosure employs the composite particle in which the $WO_3$ is disposed on the surface of the negative electrode active material. As described below, this composite particle is prepared by synthesizing the $WO_3$ on the surface of the negative electrode active material, for example. The $WO_3$ has high electron conductivity as well as lithium ion conductivity. According to a new finding in the present disclosure, the $WO_3$ disposed on the surface of the negative electrode active material serves to significantly improve the lithium ion conductivity at the surface of the negative electrode active material. Accordingly, the lithium ion secondary battery of the present disclosure is considered to have an improved large-current charging/discharging characteristic.

[2] Preferably in [1], the tungsten trioxide is disposed in a film-like form on the surface of the negative electrode active material. The aprotic solvent preferably contains propylene carbonate. The propylene carbonate preferably has a maximum volume ratio in the aprotic solvent.

Conventionally, in a lithium ion secondary battery employing graphite as a negative electrode active material, ethylene carbonate (EC) has been essential as a solvent of a non-aqueous electrolyte solution.

The EC is a cyclic carbonate. The EC has high relative permittivity. Therefore, in the non-aqueous electrolyte solution containing the EC, the lithium salt is accelerated to be dissociated. Moreover, during initial charging, a part of the EC is decomposed at the surface of the graphite. A product resulting from the decomposition of the EC forms a good covering film on the surface of the graphite. After the formation of the covering film, the solvent is suppressed from being decomposed further. This promotes smooth insertion/desertion of lithium ions to/from the graphite.

As described above, the EC is an excellent solvent. However, by using only the EC, it is difficult to construct a lithium ion secondary battery operating at a low temperature, because the EC has a melting point of 30° C. or more. Therefore, in order for the entire solvent to exhibit flowability even in a range of a low temperature to a normal temperature, a chain carbonate is mixed with the EC. The chain carbonate has a low melting point.

The large-current charging/discharging characteristic of the lithium ion secondary battery is dependent on the electric conductivity of the non-aqueous electrolyte solution. It is considered that the electric conductivity of the non-aqueous electrolyte solution becomes higher as the relative permittivity of the solvent is higher and the viscosity of the solvent is lower.

The EC has high relative permittivity but has high viscosity. On the other hand, the chain carbonate has low relative permittivity but has low viscosity. Hence, in view of a balance between the relative permittivity and the viscosity, the composition of the solvent of the non-aqueous electrolyte solution is restricted to a certain extent.

As a cyclic carbonate other than the EC, propylene carbonate (PC) has been known. The PC has a physical property suitable for the solvent of the non-aqueous electrolyte solution. That is, the PC has high relative permittivity and has a melting point of about −50° C. Therefore, a non-aqueous electrolyte solution employing the PC as a main solvent has also been studied. The "main solvent" represents a component having the largest volume ratio in the aprotic solvent. Hereinafter, the non-aqueous electrolyte solution employing the PC as the main solvent will be also referred to as "PC-based electrolyte solution".

However, when the PC-based electrolyte solution is used, it is difficult to construct a repeatedly chargeable/dischargeable lithium ion secondary battery. The PC is co-intercalated into the graphite together with lithium ions. The PC co-intercalated in the graphite is decomposed in the graphite. The decomposition causes generation of gas. The generation of gas in the graphite results in the crystalline structure of the graphite being fractured. Furthermore, unlike the EC, the PC does not form a covering film on the surface of the graphite.

Hence, in the lithium ion secondary battery including the PC-based electrolyte solution, the solvent is decomposed whenever it is charged.

The lithium ion secondary battery of the present disclosure can be configured to include the PC-based electrolyte solution. Since the $WO_3$ is disposed in the film-like form on the surface of the negative electrode active material, the co-intercalation of the PC is suppressed. Further, the $WO_3$ in the film-like form is expected to suppress decomposition of the solvent as with the covering film originating from the EC. The PC-based electrolyte solution is expected to improve a low-temperature characteristic of the lithium ion secondary battery, because the melting point of the PC is low as described above. It should be noted that the form of the $WO_3$ on the surface of the negative electrode active material can be controlled by pH or the like in a hydrothermal synthesis method as described below, for example.

[3] In [2], the propylene carbonate may have a volume ratio of more than 33 volume % and 50 volume % or less with respect to the aprotic solvent. Accordingly, the low-temperature characteristic is expected to be improved, for example.

[4] In [2] or [3], the aprotic solvent may further contain ethylene carbonate. The ethylene carbonate may have a volume ratio of more than 0 volume % and 33 volume % or less with respect to the aprotic solvent. The PC-based electrolyte solution may contain the EC as long as the PC is a main solvent. Since the PC-based electrolyte solution also contains the EC, the charging/discharging efficiency is expected to be improved, for example.

[5] A method of manufacturing a lithium ion secondary battery in the present disclosure includes (A1), (A3), (B), and (C) as follows.

(A1) A composite particle including a negative electrode active material and tungsten trioxide is prepared by synthesizing the tungsten trioxide on a surface of the negative electrode active material.

(A3) A negative electrode including the composite particle is manufactured.

(B) A non-aqueous electrolyte solution including a lithium salt and an aprotic solvent is prepared.

(C) The lithium ion secondary battery including the negative electrode, a positive electrode, and the non-aqueous electrolyte solution is manufactured.

The composite particle is prepared such that the negative electrode active material contains graphite and the tungsten trioxide is disposed on the surface of the negative electrode active material.

Since the $WO_3$ is synthesized on the surface of the negative electrode active material, the $WO_3$ is disposed on the surface of the negative electrode active material. Accordingly, the composite particle is prepared in which the negative electrode active material and the $WO_3$ are combined. In the lithium ion secondary battery manufactured to include the negative electrode including such a composite particle, the large-current charging/discharging characteristic is expected to be improved. This is presumably because the $WO_3$ has high electron conductivity and also has lithium ion conductivity.

[6] Preferably in the manufacturing method in [5], the composite particle is prepared such that the tungsten trioxide is disposed in a film-like form on the surface of the negative electrode active material. The non-aqueous electrolyte solution is preferably prepared such that the aprotic solvent contains propylene carbonate. The propylene carbonate preferably has a maximum volume ratio in the aprotic solvent.

In the manufacturing method in [6], the composite particle is prepared such that the $WO_3$ is disposed in the film-like form on the surface of the negative electrode active material. The $WO_3$ in the film-like form is expected to suppress decomposition of the PC-based electrolyte solution. Therefore, the PC-based electrolyte solution can be used. By using the PC-based electrolyte solution, the low-temperature characteristic of the lithium ion secondary battery is expected to be improved.

[7] In the method of manufacturing the lithium ion secondary battery according to [5] or [6], the tungsten trioxide may be synthesized by a hydrothermal synthesis method. The hydrothermal synthesis method is an exemplary method of synthesizing the $WO_3$ on the surface of the negative electrode active material.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Hereinafter, an embodiment (hereinafter, referred to as "the present embodiment") of the present disclosure will be described. However, the scope of the claims should not be limited to the description below.

<Lithium Ion Secondary Battery>

In the description below, a lithium ion secondary battery may be simply described as "battery".

Figure 1:
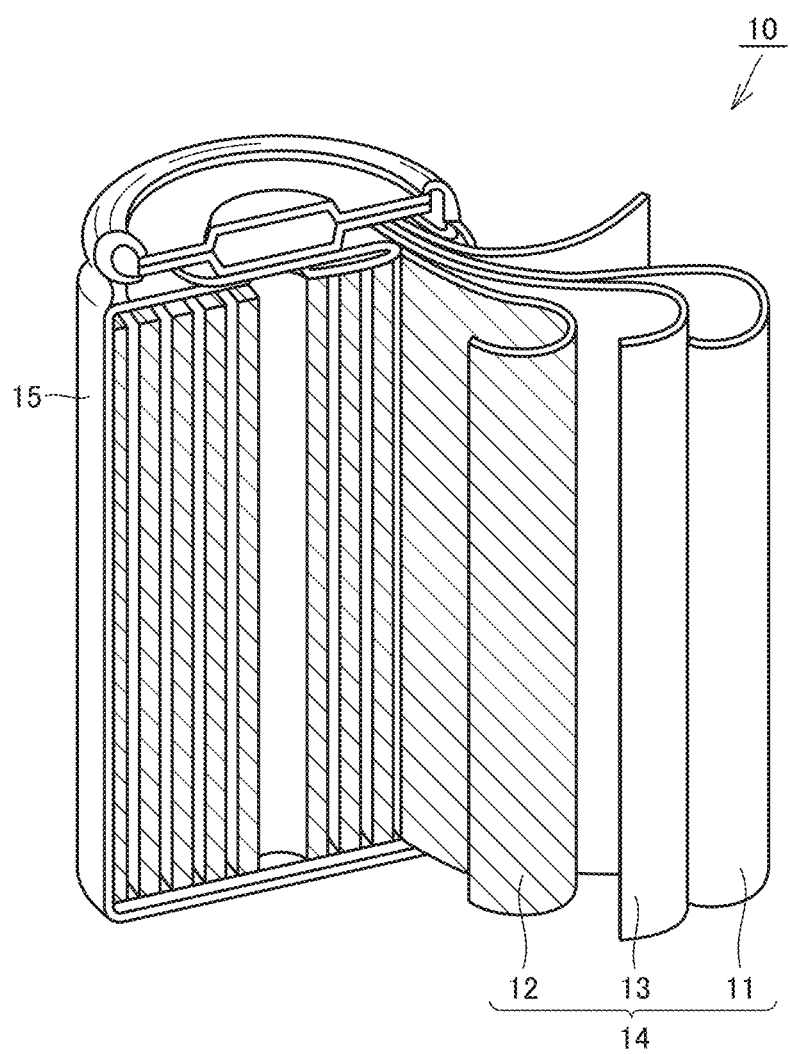
FIG. 1 is a schematic view showing an exemplary configuration of a lithium ion secondary battery according to an embodiment of the present disclosure.

FIG. 1 is a schematic view showing an exemplary configuration of a lithium ion secondary battery according to the present embodiment. Battery 10 includes a battery case 15. In FIG. 1, battery case 15 has a cylindrical shape. However, battery case 15 of the present embodiment may have a prismatic shape (rectangular parallelepiped with a flat profile), for example. Battery case 15 is composed of a metal such as an aluminum (Al) alloy or stainless steel (SUS), for example. However, battery case 15 may be a pouch constituted of, for example, an aluminum laminate film or the like as long as battery case 15 has a predetermined sealability. Battery case 15 may have a pressure-sensitive type current interrupt device (CID), a safety valve, and the like.

In battery case 15, an electrode group 14 and a non-aqueous electrolyte solution (not shown) are stored. Electrode group 14 includes a negative electrode 11, a separator 13, and a positive electrode 12. That is, battery 10 includes negative electrode 11, positive electrode 12, and the non-aqueous electrolyte solution. In FIG. 1, electrode group 14 is a wound type electrode group. Electrode group 14 is constructed by layering and winding a strip-shaped negative electrode 11 and a strip-shaped positive electrode 12 with a strip-shaped separator 13 interposed therebetween. The electrode group may be a stack type electrode group. For example, the stack type electrode group is constructed by alternately stacking rectangular negative and positive electrodes with a rectangular separator interposed therebetween.

<<Negative Electrode>>

Negative electrode 11 includes a negative electrode composite material and a current collecting foil. The current collecting foil may be composed of copper (Cu) or the like, for example. The current collecting foil may have a thickness of about 3 to 30 μm, for example. The negative electrode composite material is applied onto a surface of the current collecting foil in the form of a layer. On the surface of the current collecting foil, the negative electrode composite material may have a thickness of about 10 to 150 μm, for example.

The negative electrode composite material contains composite particles, a conductive material, a binder, and the like. That is, negative electrode 11 includes the composite particles. The negative electrode composite material contains 95 to 99 mass % of the composite particles and 1 to 5 mass % of the binder, for example. The binder should not be particularly limited. Examples of the binder include carboxymethylcellulose (CMC), styrene-butadiene rubber (SBR), polyacrylic acid (PAA), and the like. One type of binder may be solely used or two or more types of binders may be used in combination. The conductive material should not be also particularly limited. Examples of the conductive material include carbon blacks, such as acetylene black (AB), thermal black, and furnace black. The conductive material is expected to improve electron conductivity. However, such carbon-based conductive material cannot be expected to improve lithium ion conductivity.

(Composite Particle)

Each of the composite particles includes a negative electrode active material and $WO_3$. In the composite particle, the negative electrode active material and the $WO_3$ are combined. The term "combine" is intended to indicate a state in which the $WO_3$ cannot be separated from the negative electrode active material without applying external force. When the $WO_3$ is only in contact with the negative electrode active material, it is considered that the effect of improving the lithium ion conductivity becomes small.

The $WO_3$ is disposed on a surface of the negative electrode active material. Accordingly, it is considered that the lithium ion conductivity is improved significantly at the surface of the negative electrode active material. It is considered that a similar effect is not obtained when the $WO_3$ is only dispersed in the negative electrode composite material. It is desirable that there is substantially no material between the negative electrode active material and the $WO_3$. If a material such as the binder exists therebetween, the effect of improving the lithium ion conductivity is considered to become small.

(Negative Electrode Active Material)

The negative electrode active material is particles each serving as a core of the composite particle. The negative electrode active material may have an average particle size of about 1 to 20 μm, for example. The "average particle size" in the present specification represents the size of particles at an integrated value of 50% from the finest particle in volume-based particle size distribution measured by a laser diffraction scattering method.

The negative electrode active material contains graphite. The negative electrode active material is typically graphite particles. It should be noted that the expression "the negative electrode active material contains graphite" is intended to mean that the negative electrode active material has at least a portion containing a graphite crystal. The negative electrode active material may contain soft carbon, hard carbon, and the like because these materials also partially contain a graphite crystal. The graphite may be natural graphite or artificial graphite. In view of a capacity, the graphite is preferably natural graphite. In the composite particle, the graphite may have a molar ratio of about 99 to 99.9 mol % with respect to a total of the graphite and the $WO_3$, for example. In the present specification, it is assumed that 12 g of graphite corresponds to 1 mol of graphite.

The natural graphite is typically in a flake form. The negative electrode active material may be obtained by spheroidizing particles each in the flake form. That is, the negative electrode active material may be spheroidized graphite. The term "spheroidize" is intended to indicate a process of forming the outer shape of each of the particles into a shape close to a spherical shape by way of friction in air flow, pulverization, or the like, for example. The spheroidizing suppresses exposure of an edge surface, which is active with respect to the aprotic solvent. Accordingly, charging/discharging efficiency is expected to be improved, for example. The negative electrode active material may have a covering film on its surface.

For example, a mixture of the spheroidized natural graphite and a pitch is heated in an inert atmosphere at 800 to 1300° C., thereby generating spheroidized natural graphite having an amorphous carbon covering film on its surface. For example, the covering film of the amorphous carbon is expected to suppress a reaction between the natural graphite and the aprotic solvent. However, it is difficult to suppress co-intercalation of PC only with the amorphous carbon covering film.

(Tungsten Trioxide)

The $WO_3$ is disposed on the surface of the negative electrode active material. The $WO_3$ has high electron conductivity. An exemplary index for the electron conductivity is electrical resistivity. It is considered that as the electrical resistivity is lower, the electron conductivity is higher. The $WO_3$ may have an electrical resistivity of about $1.95\times10^{-8}$ Ωm, for example. The electrical resistivity of the $WO_3$ is lower than the electrical resistivity of the graphite (about $3\times10^{-4}$ Ωm at most). Further, the electrical resistivity of the $WO_3$ is comparable to the electrical resistivity ($1.68\times10^{-8}$ Ωm) of Cu. Furthermore, the $WO_3$ has lithium ion conductivity. The $WO_3$ disposed on the surface of the negative electrode active material provides significant improvement in lithium ion conductivity at the surface of the negative electrode active material.

The inclusion of the $WO_3$ in the composite particle can be confirmed through an XRD (X-ray diffractometer) and an EDX (energy dispersive X-ray fluorescence analyzer). The $WO_3$ may have a molar ratio of about 0.1 to 1 mol %, a molar ratio of about 0.2 to 0.8 mol %, or a molar ratio of about 0.4 to 0.8 mol % with respect to the total of the graphite and the $WO_3$, for example.

The $WO_3$ disposed on the surface of the negative electrode active material can be confirmed through SEM (electron microscope) observation of the composite particle. For the lithium ion conductivity, the $WO_3$ may be disposed on the surface of the negative electrode active material in a particulate form or in a film-like form. In other words, it is considered that the effect of improving the lithium ion conductivity is exhibited as long as the $WO_3$ is disposed on the surface of the negative electrode active material.

Figure 2:
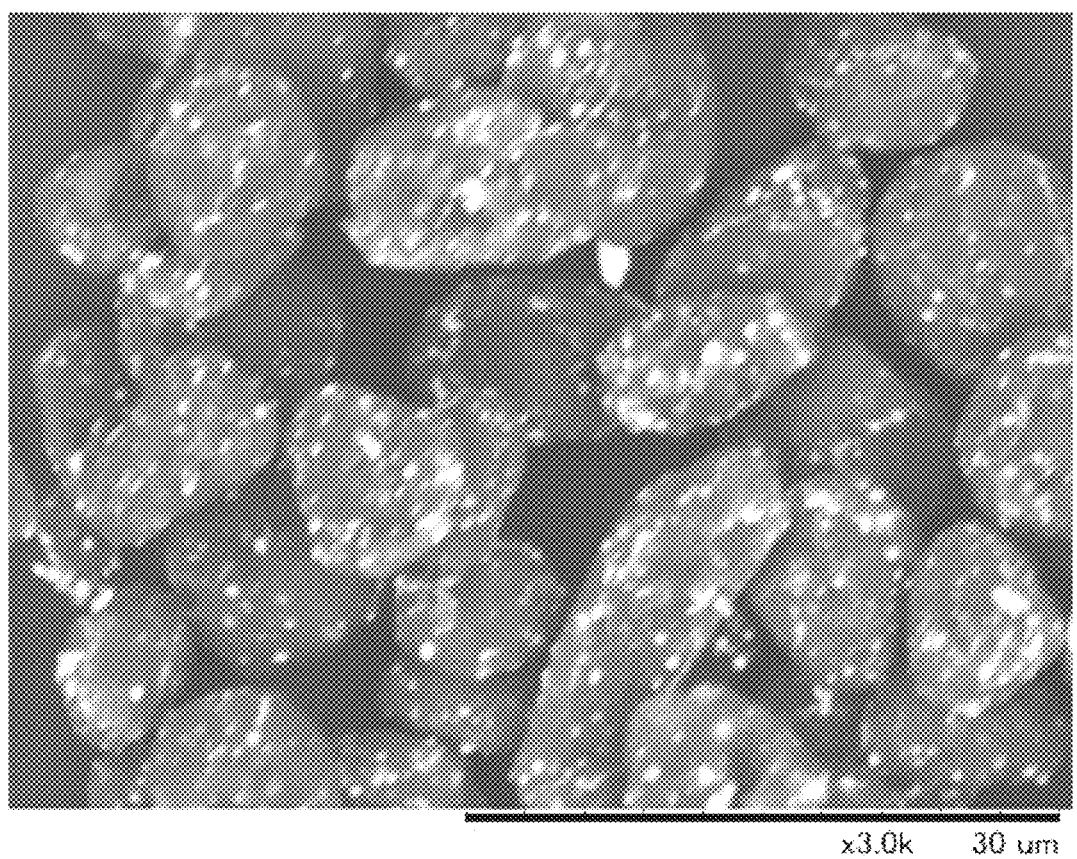
FIG. 2 shows an SEM image of composite particles according to an Example 1.

An SEM image of FIG. 2 shows the composite particles in each of which the $WO_3$ is disposed on the surface of the negative electrode active material in the particulate form. The SEM image of FIG. 2 is captured with a magnification of ×3000. In FIG. 2, white spots represent the $WO_3$ in the particulate form. Particles having surfaces involving the white spots are the negative electrode active material (spheroidized natural graphite). Typically, the $WO_3$ in the particulate form has an average particle size smaller than that of the negative electrode active material. The $WO_3$ may have an average particle size of about 10 nm to 1 μm, for example.

Figure 3:
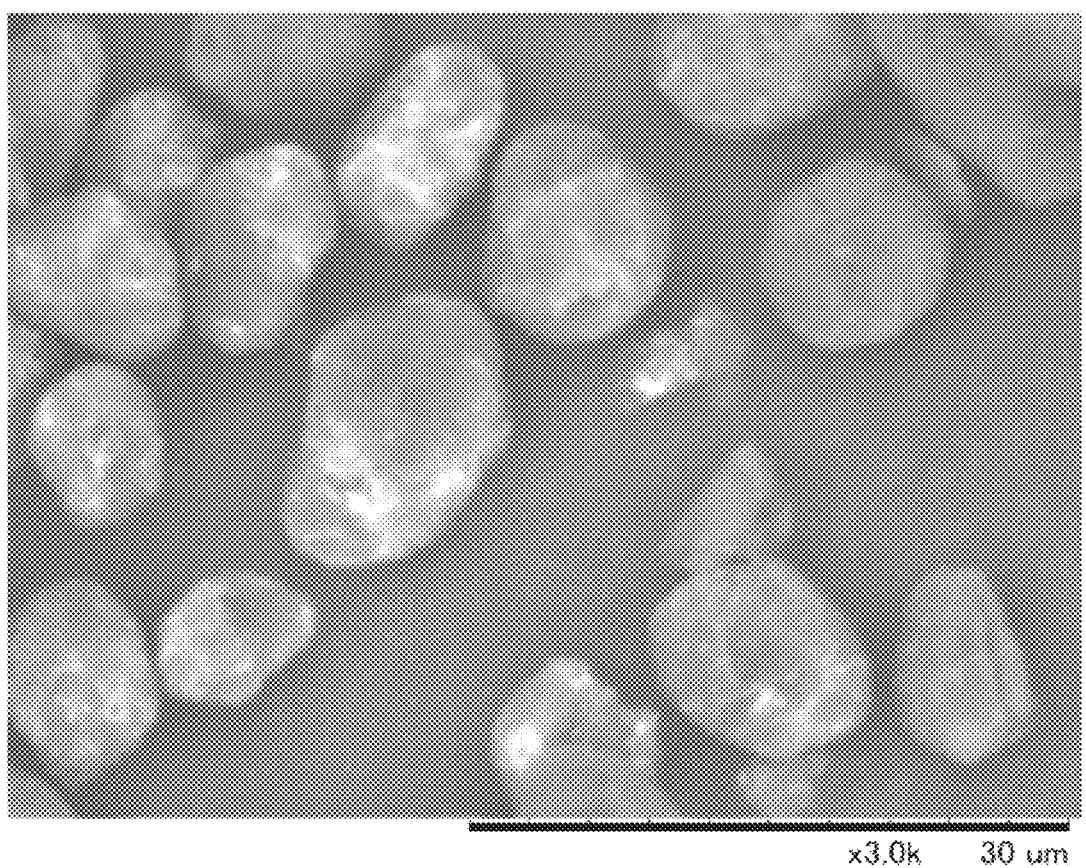
FIG. 3 shows an SEM image of composite particles according to an Example 3.

For resistance against a PC-based electrolyte solution, the $WO_3$ is preferably disposed in the film-like form on the surface of the negative electrode active material. An SEM image of FIG. 3 shows composite particles in each of which the $WO_3$ is disposed in the film-like form on the surface of the negative electrode active material. The SEM image of FIG. 3 is captured with a magnification of ×3000. In FIG. 3, white-colored regions on the surfaces of the particles (negative electrode active material) represent the $WO_3$ in the film-like form. Thus, it is assumed that the expression "$WO_3$ in the film-like form" is intended to indicate a state in which no boundary between the $WO_3$ particles can be identified at the surface of the negative electrode active material even through SEM observation with a magnification of about ×3000.

In FIG. 3, regions in each of which the surface of the negative electrode active material is exposed can be hardly confirmed. In other words, the $WO_3$ is considered to cover substantially the entire surface of the negative electrode active material. The $WO_3$ covering the entire surface of the negative electrode active material is considered to increase the resistance against a PC-based electrolyte solution. It should be noted that both the $WO_3$ in the particulate form and the $WO_3$ in the film-like form may exist on the surface of the negative electrode active material.

Whether or not the $WO_3$ is disposed in the film-like form on the surface of the negative electrode active material can be determined by determining whether or not the lithium ion secondary battery is chargeable/dischargeable when the lithium ion secondary battery includes the PC-based electrolyte solution. When the $WO_3$ is disposed in the film-like form on the surface of the negative electrode active material, the lithium ion secondary battery can be charged from 3.0 V to 4.1 V and can be discharged from 4.1 V to 3.0 V. In other words, the lithium ion secondary battery is configured to be chargeable from 3.0 V to 4.1 V and dischargeable from 4.1 V to 3.0 V.

The lithium ion secondary battery is preferably configured to be repeatedly chargeable from 3.0 V to 4.1 V and dischargeable from 4.1 V to 3.0 V. In the present specification, the expression "repeatedly chargeable and dischargeable" is intended to indicate that one sequence of charging from 3.0 V to 4.1 V and discharging from 4.1 V to 3.0 V can be performed twice or more. The lithium ion secondary battery is preferably configured to be repeatedly chargeable and dischargeable 3 times or more, is more preferably configured to be repeatedly chargeable and dischargeable 10 times or more, is further preferably configured to be repeatedly chargeable and dischargeable 100 times or more, and is most preferably configured to be repeatedly chargeable and dischargeable 200 times or more.

When the $WO_3$ is not in the film-like form, the PC is co-intercalated into the graphite during charging, thus resulting in decomposition of the graphite. This decomposition reaction causes generation of gas. Due to the generation of gas, the graphite crystal is fractured. Further, with this decomposition reaction, no covering film is formed. This results in repeated decomposition of the solvent and repeated fracture of the graphite crystal during charging. For example, electric energy supplied during initial charging is continuously used for the decomposition reaction of the solvent, with the result that the battery voltage may not reach 4.1 V. That is, the battery may not be able to be charged to 4.1 V.

<<Non-Aqueous Electrolyte Solution>>

The non-aqueous electrolyte solution is included in spaces in electrode group 14. The non-aqueous electrolyte solution includes a lithium salt and an aprotic solvent. The lithium salt is dispersed and dissolved in the aprotic solvent.

(Lithium Salt)

Examples of the lithium salt include $LiPF_6$, $LiBF_4$, $Li[N(FSO_2)_2]$, $Li[N(CF_3SO_2)_2]$, $Li[B(C_2O_4)_2]$ (commonly known as "LiBOB"), $LiPO_2F_2$, and the like. One type of lithium salt may be solely used or two or more types of lithium salts may be used in combination. In the non-aqueous electrolyte solution, the lithium salt may have a concentration of about 0.5 to 2.0 mol/l, for example.

A part or the whole of the lithium salt dispersed and dissolved in the solvent is dissociated. Accordingly, lithium ions are generated. It is considered that as a degree of dissociation of the lithium salt is higher, a larger number of lithium ions contribute to charging/discharging, thus resulting in an improved large-current charging/discharging characteristic. The degree of dissociation of the lithium salt can be increased by using a solvent having high relative permittivity.

(Aprotic Solvent)

The aprotic solvent is required to be electrochemically stable, have high relative permittivity, have low viscosity, have a low melting point, have a high boiling point, and the like. In view of these, the aprotic solvent is desirably a mixture of a cyclic carbonate and a chain carbonate. An exemplary mixture ratio of the cyclic carbonate and the chain carbonate is as follows: "cyclic carbonate:chain carbonate=1:3 to 3:1 (v:v)", where (v:v) indicate that the ratio is a volume ratio.

Examples of the cyclic carbonate include EC, PC, butylene carbonate, and the like. Examples of a cyclic carbonate having an unsaturated bond includes vinylene carbonate (VC) and the like. Examples of a cyclic carbonate containing a fluorine atom includes fluoroethylene carbonate (FEC) and the like. Examples of the chain carbonate include dimethyl carbonate (DMC), ethyl methyl carbonate (EMC), diethyl carbonate (DEC), and the like.

For example, the aprotic solvent can have a composition such as EC:EMC:DMC=1:2:1 (v:v:v), EC:DMC:DEC=1:1:1 (v:v:v), or the like, where (v:v:v) indicates that the ratio is a volume ratio. In the present specification, such a non-aqueous electrolyte solution containing no PC and containing EC is also referred to as "EC-based electrolyte solution".

In addition to these components, the aprotic solvent may contain lactone, cyclic ether, chain ether, carboxylate, or the like, for example. Examples of the lactone include γ-butyrolactone, δ-valerolactone, and the like. Examples of the cyclic ether include tetrahydrofuran, 1,3-dioxolane, 1,4-dioxane, and the like. Examples of the chain ether include 1,2-dimethoxyethane and the like. Examples of the carboxylate include methyl formate, methyl acetate, methyl propionate, and the like.

When the $WO_3$ is disposed in the film-like form on the surface of the negative electrode active material in the above-mentioned composite particle, the non-aqueous electrolyte solution may be a PC-based electrolyte solution. That is, the aprotic solvent may contain PC and the PC may have the maximum volume ratio in the aprotic solvent. The PC has a melting point lower than that of the EC. Hence, the use of the PC-based electrolyte solution is expected to improve a low-temperature characteristic. Further, the viscosity of the non-aqueous electrolyte solution is decreased at a normal temperature, whereby the large-current charging/discharging characteristic is also expected to be further improved. For example, the PC may have a volume ratio of more than 33 volume % and 50 volume % or less with respect to the aprotic solvent, or may have a volume ratio of 40 volume % or more and 50 volume % or less with respect to the aprotic solvent.

In addition to the PC, the aprotic solvent may further contain EC. The EC may have a volume ratio of more than 0 volume % and 33 volume % or less with respect to the aprotic solvent, for example. Accordingly, the charging/discharging efficiency is expected to be improved, for example. The EC may have a volume ratio of 5 volume % or more and 33 volume % or less, a volume ratio of 10 volume % or more and 25 volume % or less, or a volume ratio of 15 volume % or more and 25 volume % or less with respect to the aprotic solvent.

The aprotic solvent in the PC-based electrolyte solution can have, for example, the following composition:

PC: chain carbonate=1:3 to 3:1 (v:v)

EC:PC:chain carbonate=0 to 1:1 to 2:0 to 1 (v:v:v), where "0 to 1" indicates more than 0 and 1 or less, and "1 to 2" indicates more than 1 and 2 or less. One type of chain carbonate may be solely used or two or more types of chain carbonates may be used in combination.

The composition of the aprotic solvent and the volume ratio of the PC and the EC can be measured by GC-MS (gas chromatography-mass spectrometry device).

(Other Components)

In addition to the above-mentioned components, the non-aqueous electrolyte solution may contain other components. The non-aqueous electrolyte solution may contain about 1 to 5 mass % of the other components, for example. Examples of the other components include cyclohexylbenzene (CHB), biphenyl (BP), ethylene sulfite (ES), propane sultone (PS), and the like.

<<Positive Electrode>>

Positive electrode 12 includes a positive electrode composite material and a current collecting foil. The current collecting foil may be an Al foil or the like, for example. The current collecting foil may have a thickness of about 3 to 30 μm, for example. The positive electrode composite material is applied onto a surface of the current collecting foil in the form of a layer. On the surface of the current collecting foil, the positive electrode composite material may have a thickness of about 10 to 150 μm, for example.

The positive electrode composite material contains a positive electrode active material, a conductive material, a binder, and the like. The positive electrode composite material contains 80 to 98 mass % of the positive electrode active material, 1 to 15 mass % of the conductive material, and 1 to 5 mass % of the binder, for example. The binder should not be particularly limited. Examples of the binder may include polyvinylidene fluoride (PVdF), polytetrafluoroethylene (PTFE), PAA, and the like. The conductive material should not be also particularly limited. Examples of the conductive material include carbon blacks, such as AB, thermal black, and furnace black.

The positive electrode active material may be particles of a lithium-containing metal oxide, a lithium-containing phosphate, or the like, for example. The positive electrode active material may have an average particle size of about 1 to 20 μm, for example. Examples of the lithium-containing metal oxide include $LiCoO_2$, $LiNiO_2$, $LiMnO_2$, $LiMn_2O_4$, $LiNi_aCo_bMn_cO_2$ (where $0<a<1$, $0<b<1$, $0<c<1$, and $a+b+c=1$), and the like. As long as $0<a<1$, $0<b<1$, $0<c<1$, and $a+b+c=1$ are satisfied in $LiNi_aCo_bMn_cO_2$, a, b, and c should not be particularly limited. As an example, a composition of $a=b=c=1/3$ can be considered. Examples of the lithium-containing phosphate include $LiFePO_4$ and the like. One type of positive electrode active material may be solely used or two or more types of positive electrode active materials may be used in combination.

<<Separator>>

Battery 10 includes separator 13. That is, the lithium ion secondary battery of the present embodiment may include a separator. Separator 13 may have a thickness of about 3 to 30 μm, for example. Separator 13 electrically separates negative electrode 11 from positive electrode 12. Separator 13 can hold the nonaqueous electrolytic solution in its internal space.

Typically, separator 13 is a porous membrane composed of a resin. Separator 13 may be a porous membrane composed of polyethylene (PE), polypropylene (PP), or the like, for example. Separator 13 may have a multilayer structure. For example, separator 13 may be constructed by layering a porous membrane composed of PP, a porous membrane composed of PE and a porous membrane composed of PP in this order. Separator 13 may have a heat-resistant layer. The heat-resistant layer is a layer containing a material having a high melting point. The heat-resistant layer may contain inorganic particles such as alumina, for example.

<<Application of Lithium Ion Secondary Battery>>

As described above, the lithium ion secondary battery of the present embodiment is excellent in large-current charging/discharging characteristic. Further, when the lithium ion secondary battery of the present embodiment includes the PC-based electrolyte solution, the lithium ion secondary battery of the present embodiment can also be excellent in low-temperature characteristic. Therefore, the lithium ion secondary battery of the present embodiment is particularly suitable as a power supply for motive power in a hybrid vehicle (HV), an electric vehicle (EV), or the like, for example. However, the application of the lithium ion secondary battery of the present embodiment is not limited to such an in-vehicle application. The lithium ion secondary battery of the present embodiment is applicable to any types of applications.

<Method of Manufacturing Lithium Ion Secondary Battery>

Figure 4:
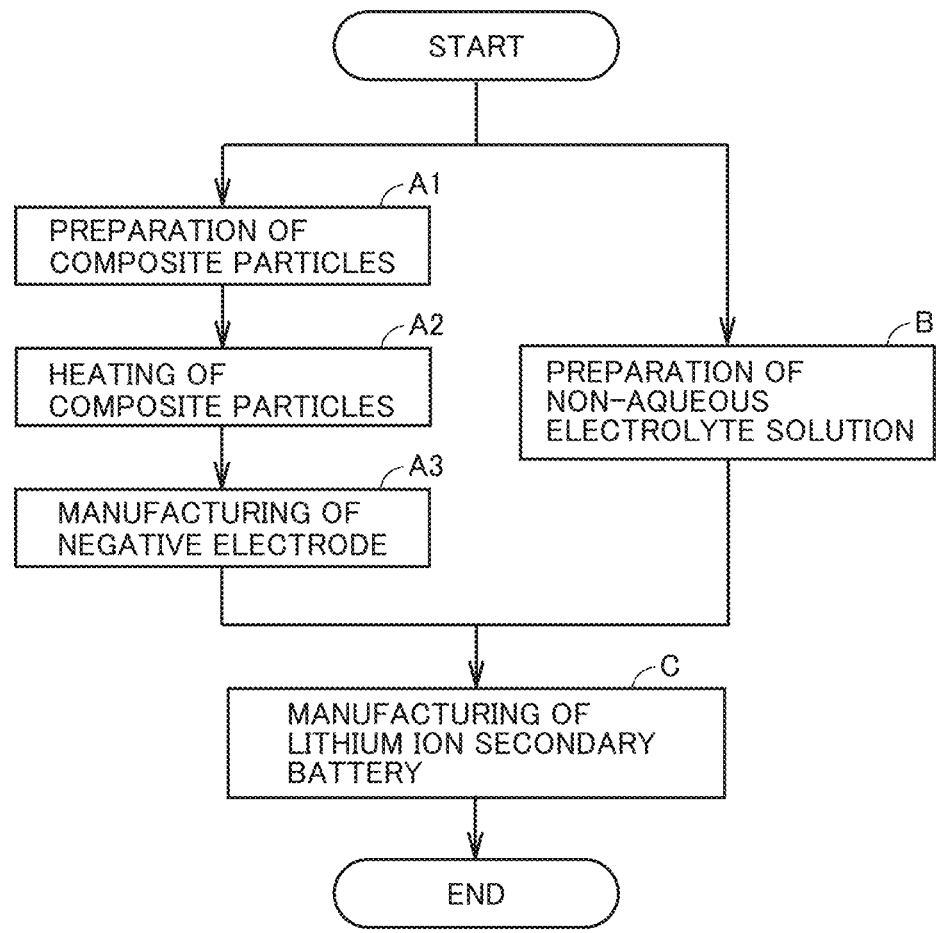
FIG. 4 is a flowchart schematically showing a method of manufacturing the lithium ion secondary battery according to the embodiment of the present disclosure.

The following describes a method of manufacturing the lithium ion secondary battery in the present embodiment. FIG. 4 is a flowchart schematically showing the method of manufacturing the lithium ion secondary battery in the present embodiment. The method of manufacturing the lithium ion secondary battery in the present embodiment includes (A1) preparation of the composite particles, (A3) manufacturing of the negative electrode, (B) preparation of the non-aqueous electrolyte solution, and (C) manufacturing of the lithium ion secondary battery.

The method of manufacturing the lithium ion secondary battery in the present embodiment preferably further includes (A2) heating of the composite particles between (A1) the preparation of the composite particles and (A3) the manufacturing of the negative electrode. The following describes the sequence of the method of manufacturing the lithium ion secondary battery.

<<(A1) Preparation of Composite Particles>>

The method of manufacturing the lithium ion secondary battery in the present embodiment includes (A1) preparing the composite particles including the negative electrode active material and the tungsten trioxide by synthesizing the tungsten trioxide on the surface of the negative electrode active material. The composite particles are prepared such that the negative electrode active material contains the graphite and the tungsten trioxide is disposed on the surface of the negative electrode active material.

As long as the $WO_3$ can be synthesized on the surface of the negative electrode active material, the method of synthesizing the $WO_3$ should not be particularly limited. The $WO_3$ can be synthesized by a hydrothermal synthesis method, a sol-gel method, a neutralization-coprecipitation method, or the like, for example. Here, the hydrothermal synthesis method will be described as an example.

(Hydrothermal Synthesis Method)

As a raw material of the $WO_3$, lithium tungstate ($Li_2WO_4$) is prepared. The $Li_2WO_4$ is dispersed in ion exchange water. Accordingly, a fluid dispersion is prepared. For the dispersing, a conventionally known agitator is used. The fluid dispersion is heated at about 50° C., for example.

Hydrochloric acid (HCl) is dropped to the fluid dispersion. Accordingly, the pH of the fluid dispersion is adjusted. The pH can be measured using a commercially available pH meter. The HCl may have a concentration of about 4 mol/l, for example. The pH of the fluid dispersion is preferably adjusted to fall within a range of 0.5 or more and 2.0 or less. In this pH range, the $WO_3$ is likely to be synthesized in the particulate form or the film-like form. When the pH becomes less than 0.5, $H_2WO_4$ may be generated. The pH of the fluid dispersion is more preferably adjusted to fall within a range of 0.5 or more and less than 1.5. In this pH range, the $WO_3$ is likely to be synthesized in the film-like form.

An autoclave is prepared. The negative electrode active material is prepared. The negative electrode active material contains the graphite. The negative electrode active material is typically spheroidized natural graphite. The pH-adjusted fluid dispersion and the negative electrode active material are introduced into the autoclave. On this occasion, the $Li_2WO_4$ may have a molar ratio of about 0.1 to 1 mol % with respect to the total of the $Li_2WO_4$ and the negative electrode active material, for example.

The autoclave is sealed. The autoclave is held for a predetermined period at a temperature of 120° C. or more and 200° C. or less (typically, 120° C. or more and 150° C. or less), for example. For example, the autoclave is introduced into an oil bath adjusted to 120° C. or more and 200° C. or less. Here, it is assumed that when the temperature of the oil is 120° C., hydrothermal synthesis is performed at a temperature of 120° C., for example. The temperature of the oil can be measured using a commercially available thermometer. The holding period may be about one to seven days (typically two days or more and four days or less), for example.

With the above operation, the $WO_3$ is synthesized on the surface of the negative electrode active material. In other words, the $WO_3$ is synthesized from the $Li_2WO_4$ at 120° C. or more and 200° C. or less (typically 120° C. or more and 150° C. or less) in water having a pH of 0.5 or more and 2.0 or less (or a pH of 0.5 or more and less than 1.5). Accordingly, the composite particles including the negative electrode active material and the $WO_3$ are prepared. The negative electrode active material contains graphite. The $WO_3$ is disposed on the surface of the negative electrode active material.

The composite particles are collected as follows. The autoclave is opened. Solid matters are collected through suction filtration. (i) The solid matters are dispersed in ion exchange water. Accordingly, a fluid dispersion is prepared. (ii) The fluid dispersion is subjected to suction filtration, thereby collecting the residue (solid matters). The operation of (i) and (ii) is repeated until the filtrate becomes transparent. The operation is repeated about 3 to 9 times (typically 5 times or more and 7 times or less). After the transparent filtrate is obtained, the residue (composite particles) is collected. The composite particles are dried under a reduced pressure at a temperature of about 80 to 100° C.

<<(A2) Heating of Composite Particles>>

After the drying under the reduced pressure, the composite particles are preferably further heated. Specifically, the method of manufacturing the lithium ion secondary battery in the present embodiment preferably further includes (A2) heating the composite particles at 200° C. or more and 450° C. or less in an oxygen-containing atmosphere. Accordingly, crystallinity of the $WO_3$ is expected to be improved. The improved crystallinity of the $WO_3$ is expected to improve the large-current charging/discharging characteristic.

The heating is performed in the oxygen-containing atmosphere. The oxygen-containing atmosphere may be atmospheric air, for example. In other words, the oxygen content of the oxygen-containing atmosphere may be about 10 to 30 volume % (typically 20 volume %). For the heating, an electric furnace is used, for example. Here, for example, it is assumed that when a thermometer attached to the electric furnace indicates 450° C., the composite particles are heated at 450° C.

In the present embodiment, during the hydrothermal synthesis, tungstic acid ($H_2WO_4$) may also be generated as an impurity. By heating the composite particles at a temperature of 200° C. or more, the $H_2WO_4$ can be decomposed and cease to exist while promoting crystal growth of the $WO_3$. However, when the heating temperature becomes more than 450° C., the graphite contained in the negative electrode active material may be burned. When the graphite is burned to cease to exist, the capacity is decreased. The composite particles may be heated at 300° C. or more and 450° C. or less, or may be heated at 400° C. or more and 450° C. or less. The composite particles may be heated for 1 to 5 hours (typically, 2 hours or more and 4 hours or less), for example.

<<(A3) Manufacturing of Negative Electrode>>

The method of manufacturing the lithium ion secondary battery in the present embodiment includes (A3) manufacturing the negative electrode including the composite particles.

Negative electrode 11 can be manufactured by a conventionally known method. For example, by mixing the composite particles, the conductive material, the binder, and the solvent, a coating material including the negative electrode composite material is prepared. The solvent is selected according to the binder. When the binder is CMC and SBR, the solvent may be water, for example. For the mixing, a general agitator/mixer is used. The coating material may have a solid content of about 50 to 60 mass %, for example. The solid content indicates a mass ratio of components other than the solvent in the coating material.

The coating material is applied onto a surface of the current collecting foil and is then dried. Accordingly, the negative electrode composite material is applied on the surface of the current collecting foil in the form of a layer. That is, negative electrode 11 including the composite particles is manufactured. For the application, a die coater is used, for example. The negative electrode is processed into a predetermined size in accordance with the specification of the battery. The processing herein includes rolling and cutting.

<<(B) Preparation of Non-Aqueous Electrolyte Solution>>

The method of manufacturing the lithium ion secondary battery in the present embodiment includes (B) preparing the non-aqueous electrolyte solution including the lithium salt and the aprotic solvent.

The non-aqueous electrolyte solution is prepared by dissolving the lithium salt in the aprotic solvent. When the composite particles are prepared to dispose the $WO_3$ in the film-like form on the surface of the negative electrode active material, the non-aqueous electrolyte solution may be prepared as a PC-based electrolyte solution. In other words, the non-aqueous electrolyte solution may be prepared such that the aprotic solvent contains PC and the PC has the maximum volume ratio in the aprotic solvent. This is because it is expected that the $WO_3$ in the film-like form serve to suppress co-intercalation of the PC.

<<(C) Manufacturing of Lithium Ion Secondary Battery>>

The method of manufacturing the lithium ion secondary battery in the present embodiment includes (C) manufacturing the lithium ion secondary battery including the negative electrode, the positive electrode, and the non-aqueous electrolyte solution.

Positive electrode 12 can be manufactured by a conventionally known method. For example, the positive electrode active material, the conductive material, and the binder are mixed, thereby preparing a coating material including the positive electrode composite material. The solvent is selected according to the binder. When the binder is PVdF, the solvent may be N-methyl-2-pyrrolidone (NMP), for example. For the mixing, a general agitator/mixer is used. The coating material may have a solid content of about 50 to 60 mass %, for example.

The coating material is applied onto a surface of the current collecting foil, and is then dried. Accordingly, the positive electrode composite material is applied on the surface of the current collecting foil in the form of a layer. That is, the positive electrode is manufactured. For the application, a die coater is used, for example. The positive electrode is processed into a predetermined size in accordance with the specification of the battery. The processing herein includes rolling and cutting.

Electrode group 14 including negative electrode 11, positive electrode 12, and separator 13 is constructed. Separator 13 is disposed between negative electrode 11 and positive electrode 12. Battery case 15 is prepared. Electrode group 14 is stored in battery case 15. The non-aqueous electrolyte solution is injected into battery case 15. Battery case 15 is sealed. In this way, battery 10 (lithium ion secondary battery) is manufactured.

EXAMPLES

Hereinafter, Examples will be described. The examples below, however, do not limit the scope of claims.

<Manufacturing of Lithium Ion Secondary Battery>

Lithium ion secondary batteries according to Examples and Comparative Examples were manufactured in the following manners.

Example 1

(A1) Preparation of Composite Particles

In Example 1, the hydrothermal synthesis method was employed to synthesize $WO_3$ on a surface of a negative electrode active material. Accordingly, there were prepared composite particles in each of which the $WO_3$ was disposed on the surface of the negative electrode active material. Hereinafter, a specific procedure will be described.

19.7 g of $Li_2WO_4$ was dispersed in 120 ml of ion exchange water. Accordingly, a fluid dispersion was prepared. The fluid dispersion was heated to 50° C. 4 mol/l of HCl was prepared. By dropping the HCl to the fluid dispersion, the pH of the fluid dispersion was adjusted to 1.5.

As the negative electrode active material, spheroidized natural graphite (average particle size of 10 μm; provided by Hitachi Chemical Co., Ltd.) was prepared. An autoclave having an internal volume of 300 ml was prepared. The pH-adjusted fluid dispersion and 160 g of the negative electrode active material were introduced into the autoclave. The autoclave was sealed. The autoclave was held for 3 days in an oil bath of 120° C. Accordingly, $WO_3$ was synthesized on the surface of the negative electrode active material. That is, there were prepared composite particles each including the negative electrode active material and the $WO_3$.

The autoclave was opened. By suction filtration, solid matters were collected. (i) The solid matters were dispersed in 500 ml of ion exchange water. Accordingly, a fluid dispersion was prepared. (ii) The fluid dispersion was subjected to suction filtration, thereby collecting a residue (solid matters). The operation of (i) and (ii) was repeated 6 times. Accordingly, a transparent filtrate was obtained. The residue was dried at a temperature of 100° C. under a reduced pressure. In this way, composite particles according to Example 1 were obtained.

Figure 5:
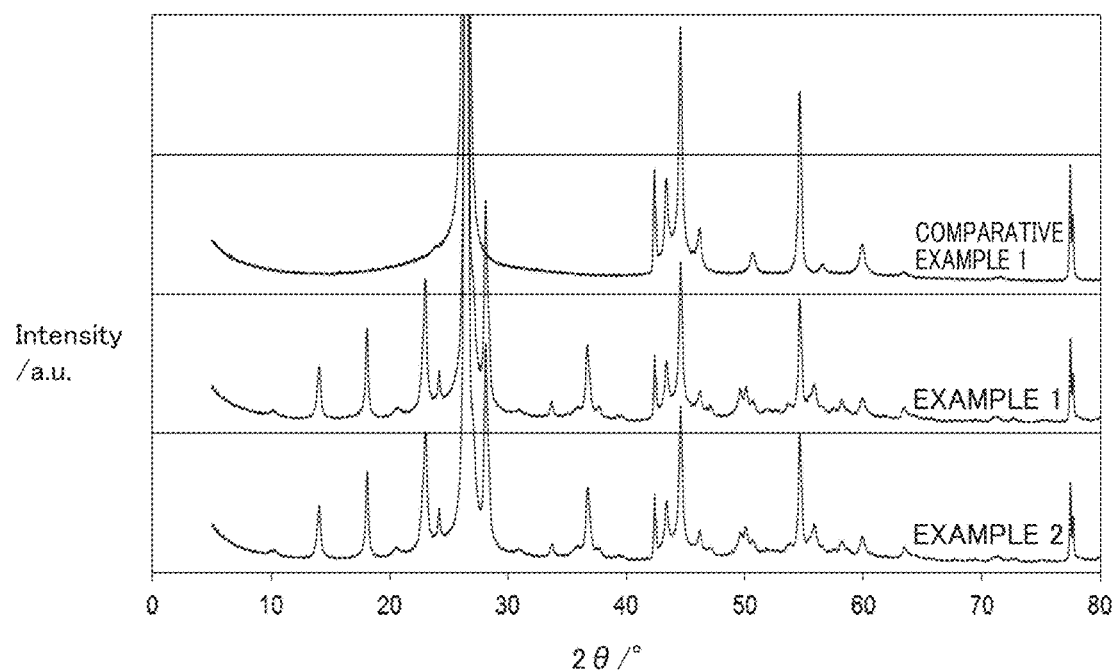
FIG. 5 is an XRD chart of composite particles according to Examples.

FIG. 2 shows an SEM image of the composite particles according to Example 1. In FIG. 2, it can be confirmed that there are white spots on the surface of the negative electrode active material (spheroidized natural graphite). The white spots are in the particulate form. FIG. 5 is an XRD chart of the composite particles according to the Examples. FIG. 5 also shows an XRD chart of non-treated spheroidized natural graphite (corresponding to Comparative Example 1 described below). In the composite particles according to Example 1, peaks not present in the spheroidized natural graphite (Comparative Example 1) were confirmed. As a result of verification against the JCPDS (Joint Committee on Powder Diffraction Standards) card, it was confirmed that the peaks originated from the $WO_3$. That is, in FIG. 2, it was confirmed that the $WO_3$ was disposed on the surface of the negative electrode active material in the particulate form.

It is considered that peaks common between Example 1 and Comparative Example 1 originated from the graphite. There is substantially no difference between Example 1 and Comparative Example 1 in terms of the peaks originating from the graphite. Therefore, it is considered that the negative electrode active material was substantially unchanged before and after the synthesis of the $WO_3$.

(A3) Manufacturing of Negative Electrode

The following materials were prepared.

Binder: CMC (product type "BSH-6"; provided by DKS Co. Ltd.) and SBR (grade "TRD102A"; provided by JSR Corporation)

Solvent: water

Current collecting foil: rolled copper foil (thickness of 10 μm)

98 parts by mass of the composite particles, 1 part by mass of the CMC, 1 part by mass of the SBR, and the solvent were mixed. Accordingly, a coating material including a negative composite material was prepared. The coating material had a solid content of 55 mass %. The coating material was applied onto a surface of the current collecting foil, and was then dried. In other words, the negative electrode composite material is applied on the surface of the current collecting foil in the form of a layer. An amount of the applied negative electrode composite material after the drying was 5.5 mg/cm$^2$.

A negative electrode was cut into a predetermined size. The negative electrode includes: a composite material portion with a size of 31 mm×31 mm; and a current collecting portion. The composite material portion is a portion having the negative electrode composite material applied thereon. The current collecting portion is a portion in which the current collecting foil is exposed due to detachment of the negative electrode composite material.

(B) Preparation of Non-Aqueous Electrolyte Solution

Three types of non-aqueous electrolyte solutions described below were prepared. In each of the non-aqueous electrolyte solutions, a mixture ratio of an aprotic solvent is a volume ratio.

First EC-based electrolyte solution: 1 mol/l LiPF$_6$, EC:DMC:DEC=1:1:1

Second EC-based electrolyte solution: 1 mol/l LiPF$_6$, EC:EMC:DMC=1:2:1

PC-based electrolyte solution: 1 mol/l LiPF$_6$, EC:PC:DMC=1:2:1

(C) Manufacturing of Lithium Ion Secondary Battery

The following materials were prepared.

Positive electrode active material: LiNi$_{1/3}$Co$_{1/3}$Mn$_{1/3}$O$_2$ (average particle size of 5 μm)

Conductive material: AB (product name "HS-100"; provided by Denka Company Limited)

Binder: PVdF (grade "#1300"; provided by Kureha Corporation)

Solvent: NMP

Current collecting foil: Al foil (thickness of 15 mm)

85 parts by mass of the positive electrode active material, 12 parts by mass of the conductive material, and 3 parts by mass of the binder were dispersed in a solvent and were mixed. Accordingly, a coating material including the positive electrode composite material was prepared. The coating material was applied onto a surface of the current collecting foil, and was then dried. In other words, the positive electrode composite material was applied on the surface of the current collecting foil in the form of a layer. An amount of the applied positive electrode composite material after the drying was 11 mg/cm$^2$. A positive electrode was cut into a predetermined size. The positive electrode includes: a composite material portion with a size of 29 mm×29 mm; and a current collecting portion.

A separator having a thickness of 20 μm was prepared. The separator is composed of PE. The negative electrode, the separator, and the positive electrode were stacked such that the separator is located between the negative electrode and the positive electrode. Accordingly, an electrode group was constructed. A battery case constituted of an aluminum laminate film was prepared. The electrode group was stored in the battery case. 1 ml of the first EC-based electrolyte solution was injected into the battery case. The battery case was sealed. Accordingly, a lithium ion secondary battery including the first EC-based electrolyte solution was manufactured.

A lithium ion secondary battery was manufactured in the same procedure as the above-described procedure except that the second EC-based electrolyte solution was used instead of the first EC-based electrolyte solution.

A lithium ion secondary battery was manufactured in the same procedure as the above-described procedure except that the PC-based electrolyte solution was used instead of the first EC-based electrolyte solution.

Example 2

(A2) Heating of Composite Particles

The composite particles according to Example 1 were heated at 450° C. in atmospheric air for 3 hours. Except this, a lithium ion secondary battery including the first EC-based electrolyte solution was manufactured in the same procedure as that in Example 1.

FIG. 5 also shows an XRD chart of the composite particles according to Example 2. As a result of a detailed analysis of the XRD chart, the half widths of a peak around 14° and a peak around 24.1° in Example 2 were narrower than those in Example 1. This is presumably because the crystal growth of the WO$_3$ was promoted by heating in the atmospheric air.

It should be noted that a sample obtained by heating the composite particles according to Example 1 at 550° C. in the atmospheric air for 3 hours was also produced; however, it was confirmed that the mass of this sample was reduced by about 30%. It is considered that the reduction of the mass resulted from burning of the graphite. This sample was not subjected to battery evaluation and the like.

Example 3

In Example 3, the pH of a fluid dispersion including Li$_2$WO$_4$ was adjusted to 0.5. In the same procedure as that in Example 1 except this, composite particles were prepared to manufacture a lithium ion secondary battery including the second EC-based electrolyte solution, as well as a lithium ion secondary battery including the PC-based electrolyte solution.

Through XRD, it was confirmed that also in Example 3, the WO$_3$ had been synthesized as in Example 1. FIG. 3 shows an SEM image of the composite particles according to Example 3. In FIG. 3, it was confirmed that the WO$_3$ was disposed in the film-like form on the surface of the negative electrode active material. Through SEM-EDX, it was also confirmed that W and O were distributed uniformly on the entire surface of the carbon (negative electrode active material). It is considered that the WO$_3$ covered substantially the entire surface of the negative electrode active material.

Example 4

(A2) Heating of Composite Particle

The composite particles according to Example 3 were heated at 450° C. in atmospheric air for 3 hours. In the same procedure as that in Example 3 except this, there were manufactured: a lithium ion secondary battery including the second EC-based electrolyte solution; and a lithium ion secondary battery including the PC-based electrolyte solution.

It should be noted that a sample was also produced by heating the composite particles according to Example 3 at 550° C. in the atmospheric air for 3 hours; however, it was confirmed that the mass of this sample was reduced by about 30%. It is considered that the reduction of the mass resulted from burning of the graphite. Therefore, this sample was not subjected to battery evaluation and the like.

Comparative Example 1

In Comparative Example 1, non-treated spheroidized natural graphite was used instead of the composite particles. An amount of applied negative electrode composite material after drying was 5.0 mg/cm$^2$. In the same procedure as that in Example 1 except these, there were manufactured: a lithium ion secondary battery including the first EC-based electrolyte solution; a lithium ion secondary battery including the second EC-based electrolyte solution; and a lithium ion secondary battery including the PC-based electrolyte solution.

Comparative Example 2

In Comparative Example 2, there were prepared composite particles in each of which acetylene black was disposed on the surface of the negative electrode active material in the particulate form. The composite particles were prepared by a mechanochemical method. Hereinafter, a specific procedure will be described.

96 parts by mass of a negative electrode active material (spheroidized natural graphite), 5 parts by mass of AB, 5 parts by mass of a pitch were mixed. Accordingly, a mixture was prepared. The mixture was heated at 900° C. in a nitrogen atmosphere for 12 hours. Accordingly, composite particles were prepared. An amount of the applied negative electrode composite material after drying was 5.2 mg/cm$^2$. In the same procedure as that in Example 1 except these, a lithium ion secondary battery including the first EC-based electrolyte solution was manufactured.

Comparative Example 3

In Comparative Example 3, composite particles were prepared in each of which trilithium phosphate ($Li_3PO_4$) was disposed on a surface of the negative electrode active material in a particulate form. The $Li_3PO_4$ was synthesized on the surface of the negative electrode active material by the neutralization-coprecipitation method. It is considered that the neutralization-coprecipitation method is applicable also to synthesis of $WO_3$. Hereinafter, a specific procedure will be described.

5.04 g of lithium hydroxide monohydrate ($LiOH \cdot H_2O$) and 5 mg of polyvinylpyrrolidone were dissolved in 400 ml of ion exchange water. Accordingly, a first solution was prepared.

4.61 g of phosphoric acid (85%) was dissolved in 200 ml of ion exchange water. Accordingly, a solution was prepared. Into this solution, 100 g of the negative electrode active material (spheroidized natural graphite) and 50 ml of ion exchange water were added. Accordingly, a second solution was prepared.

The first solution was dropped into the second solution. Accordingly, a mixed solution was prepared. The mixed solution was agitated for 2 hours. The mixed solution was subjected to suction filtration, thereby collecting solid matters.

The solid matters were dispersed in 500 ml of ion exchange water. Accordingly, a fluid dispersion was prepared. The fluid dispersion was subjected to suction filtration, thereby collecting solid matters.

The solid matters were dispersed in 500 ml of ethanol. Accordingly, a fluid dispersion was prepared. The fluid dispersion was subjected to suction filtration, thereby collecting solid matters.

The solid matters were dried at 80° C. under a reduced pressure. In this way, composite particles were obtained. Except that these composite particles were used, a lithium ion secondary battery including the first EC-based electrolyte solution was manufactured in the same manner as in Example 1.

Comparative Example 4

In Comparative Example 4, there were prepared composite particles in each of which amorphous carbon was disposed in a film-like form on a surface of a negative electrode active material. Hereinafter, a specific procedure will be described.

The negative electrode active material (spheroidized natural graphite) and a pitch were mixed. Accordingly, a mixture was prepared. An amount of the pitch was adjusted to be 3 mass % with respect to the negative electrode active material after heating. The mixture was kneaded at 80° C. The kneaded mixture was heated at 900° C. in an inert atmosphere for 12 hours. In this way, composite particles were obtained. In the same manner as in Example 1 except that these composite particles were used, there were manufactured: a lithium ion secondary battery including the second EC-based electrolyte solution; and a lithium ion secondary battery including the PC-based electrolyte solution.

Comparative Example 5

In Comparative Example 5, composite particles were prepared in each of which lithium niobate ($LiNbO_3$) was disposed in a film-like form on a surface of a negative electrode active material. The $LiNbO_3$ was synthesized by the sol-gel method on the surface of the negative electrode active material. It is considered that the sol-gel method is applicable also to synthesis of $WO_3$. Hereinafter, a specific procedure will be described.

In a glove box purged with argon (Ar), 3.90 g of lithium ethoxide was dissolved in 250 ml of dehydrated ethanol. Accordingly, a first solution was prepared. In the same glove box, 23.87 g of niobium ethoxide was dissolved in 250 ml of dehydrated ethanol. Accordingly, a second solution was prepared. In the same glove box, the first solution and the second solution were mixed. Accordingly, the mixed solution was prepared. In the glove box, 300 g of the negative electrode active material (spheroidized natural graphite) was introduced into the mixed solution. Accordingly, a mixture was prepared.

The mixture was removed from the glove box. The mixture was agitated for 3 days in the atmospheric air.

During the agitation, there was substantially no increase in viscosity. After passage of the 3 days, the mixture was heated while continuing the agitation, thereby condensing the mixture. The condensed mixture exhibited a high viscosity. The mixture was dried at 100° C. under a reduced pressure. Accordingly, 309 g of solid matters were collected.

200 g of the collected solid matters were heated at 400° C. in the atmospheric air. After the heating, the mass of the solid matters were not substantially decreased. In this way, the composite particles were obtained. Through SEM-EDX, it was confirmed that Nb was distributed uniformly on the surface of the carbon (negative electrode active material) in each of the composite particles. In the same procedure as that in Example 1 except that these composite particles were used, there were manufactured: a lithium ion secondary battery including the second EC-based electrolyte solution; and a lithium ion secondary battery including the PC-based electrolyte solution.

It should be noted that a sample was also produced by heating 100 g of the collected solid matters at 500° C. in the atmospheric air; however, it was confirmed that the mass of this sample was reduced by about 3%. It is considered that the reduction of the mass resulted from burning of the graphite. Therefore, this sample was not subjected to battery evaluation and the like.

Comparative Example 6

In Comparative Example 6, a negative electrode active material, $WO_3$, and a binder were mixed to prepare a negative electrode composite material. Comparative Example 6 corresponds to an example in which the $WO_3$ is simply dispersed in the negative electrode composite material.

The $WO_3$ was synthesized without introducing the negative electrode active material (spheroidized natural graphite) into the autoclave in (A1) the preparation of the composite particles of Example 1. The $WO_3$ in a powdery form was collected. The $WO_3$, the negative electrode active material, the binder, and a solvent were mixed, thereby preparing a coating material including the negative electrode composite material. In the same procedure as that in Example 1 except these, there were manufactured: a lithium ion secondary battery including the first EC-based electrolyte solution; a lithium ion secondary battery including the second EC-based electrolyte solution; and a lithium ion secondary battery including the PC-based electrolyte solution.

TABLE 1

List of Examples and Comparative Examples

| | Negative Electrode Composite Particle | | | | Particle Evaluation Powder | Negative Electrode Evaluation Electrode | Battery Evaluation Non-Aqueous Electrolyte Solution | | |
|---|---|---|---|---|---|---|---|---|---|
| | | | | | | | First EC-based Large-Current Charging/ Discharging Characteristic | Second EC-based Rate Characteristic | PC-based Initial Charging/ Discharging |
| | Negative Electrode Active Material | Additive Type | Manufacturing Method | State of Existence | Resistance mΩ | Resistance mΩ | Capacity Maintenance Ratio % | 50 mA/2 mA % | Efficiency % |
| Comparative Example 1 | Graphite | None | — | — | 3.1 | 7.84 | 82 | 92 | Cannot be Charged to 4.1 V |
| Comparative Example 2 | Graphite | AB | Mechano-chemical | Disposed on Surface (in Particulate Form) | — | 2.77 | 85 | — | — |
| Comparative Example 3 | Graphite | $Li_3PO_4$ | Neutralization-Coprecipitation | Disposed on Surface (in Particulate Form) | — | 11.16 | 79 | — | — |
| Comparative Example 4 | Graphite | Amorphous Carbon | Pitch Coat | Disposed on Surface (in Film-Like Form) | 3.8 | — | — | 89 | 83 |
| Comparative Example 5 | Graphite | $LiNbO_3$ | Sol-Gel | Disposed on Surface (in Film-Like Form) | 6.9 | — | — | 85 | 81 |
| Comparative Example 6 | Graphite | $WO_3$ | Powder Mixing | Dispersed in Composite Material | 2.9 | 5.12 | 84 | 93 | Cannot be Charged to 4.1 V |
| Example 1 | Graphite | $WO_3$ | Hydrothermal Synthesis (PH = 1.5) | Disposed on Surface (in Particulate Form) | 2.7 | 3.03 | 96 | 94 | Cannot be Charged to 4.1 V |
| Example 2 | Graphite | $WO_3$ | Hydrothermal Synthesis (PH = 1.5) +450° C. Heating | Disposed on Surface (in Particulate Form) | — | 2.65 | 98 | — | — |
| Example 3 | Graphite | $WO_3$ | Hydrothermal Synthesis (PH = 0.5) | Disposed on Surface (in Film-Like Form) | 2.9 | — | — | 93 | 84 |
| Example 4 | Graphite | $WO_3$ | Hydrothermal Synthesis (PH = 0.5) +450° C. Heating | Disposed on Surface (in Film-Like Form) | 2.8 | — | — | 93 | 84 |

<Evaluation>

<<Measurement of Powder Resistance>>

A powder resistance measurement system (product name "MCP-PD51 type") and a resistivity meter (product name "Loresta-GP") were prepared, both of which were provided by Mitsubishi Chemical Analytech Co., Ltd. 5 g of the composite particles was weighed. In Comparative Example 1, non-treated spheroidized natural graphite was weighed instead of the composite particles. The composite particles were introduced into a sample chamber of the powder resistance measurement system. The composite particles were fed with a load of 20 kN. Under application of the load, DC resistance was measured. Results are shown in the column "Powder Resistance" in Table 1. It is indicated that as the powder resistance is lower, the composite particles have higher electron conductivity.

<<Measurement of Electrode Resistance>>

Two samples each having a predetermined area were cut from the negative electrode. Each sample includes: a composite material portion in which the negative electrode composite material is applied; and a current collecting portion in which the current collecting foil is exposed. The size of the composite material portion was 30 mm×30 mm. The size of the current collecting portion was 5 mm×10 mm. The two samples were stacked on each other such that the composite material portions thereof face each other. A load of 2 kN was applied to the samples in the stacking direction of the samples. Through the current collecting portion, the resistance of the composite material portion was measured. The resistance was measured by a four probe method. Results are shown in the column "Electrode Resistance" in Table 1. It is indicated that as the electrode resistance is lower, the negative electrode including the composite particles has higher electron conductivity.

<<Measurement of Initial Capacity>>

The initial capacity of each of the lithium ion secondary batteries was measured.

After the battery case was sealed, the battery was settled at a room temperature for 12 hours. The battery was charged to a voltage of 4.1 V at a constant current of 2 mA. After the voltage reached 4.1 V, a pause for 30 minutes was provided and then the battery was discharged to a voltage of 3.0 V at a constant current of 2 mA. Next, the battery were charged and discharged under the following conditions. The discharging capacity on this occasion was regarded as the initial capacity. The initial capacities of the respective batteries were slightly varied but were 10 to 11 mAh.

CCCV charging: CC current=10 mA, CV voltage=4.1 V, charging time=2 hours

CCCV discharging: CC current=10 mA, CV voltage=3.0 V, discharging time=2 hours

"CC" represents a constant current mode, "CV" represents a constant voltage mode, and "CCCV" represents a constant current-constant voltage mode.

<<Evaluation of Large-Current Charging/Discharging Characteristic>>

A large-current charging/discharging characteristic of each lithium ion secondary battery including the first EC-based electrolyte solution was evaluated.

First, the battery was charged to a voltage of 4.0 V at a constant current of 10 mA. After the voltage reached 4.0 V, a pause for 10 minutes was provided.

A sequence "CC charging (200 mA×5 seconds)→pause (10 seconds)→CC discharging (200 mA×5 seconds)" is defined as one cycle, and this cycle was repeated 200 times. Then, a post-test capacity was measured in the same procedure as in the "Measurement of Initial Capacity" above.

By dividing the post-test capacity by the initial capacity, a capacity maintenance ratio was calculated. Results are shown in the column "Large-Current Charging/Discharging Characteristic: Capacity Maintenance Ratio" in Table 1. It is indicated that as the capacity maintenance ratio is higher, the large-current charging/discharging characteristic are more excellent.

<<Rate Characteristic>>

The rate characteristic of each lithium ion secondary battery including the second EC-based electrolyte solution was evaluated.

First, the battery was charged to a voltage of 4.1 V at a constant current of 2 mA. After a pause for 30 minutes, the battery was discharged to a voltage of 3.0 V at a constant current of 2 mA.

Then, the battery was charged to a voltage of 4.1 V at a constant current of 2 mA. After a pause for 30 minutes, the battery was discharged to a voltage of 3.0 V at a constant current of 50 mA. A ratio of the discharging capacity during the discharging at 50 mA to the discharging capacity during the discharging at 2 mA was calculated. Results are shown in the column "Rate Characteristic: 50 mA/2 mA" in Table 1. It is indicated that as the ratio is higher, the rate characteristic (large-current discharging characteristic) is more excellent.

<<Evaluation of PC Resistance>>

In each lithium ion secondary battery including the PC-based electrolyte solution, the PC resistance of the composite particles was evaluated. After the battery case was sealed, the battery was settled at a room temperature for 12 hours. The battery was charged to a voltage of 4.1 V at a constant current of 2 mA. After the voltage reached 4.1 V, a pause for 30 minutes was provided and the battery was discharged to a voltage of 3.0 V at a constant current of 2 mA. By dividing the discharging capacity by the charging capacity, initial charging/discharging efficiency was calculated. Results are shown in the column "Initial Charging/Discharging Efficiency" in Table 1. It is indicated that as the initial charging/discharging efficiency is higher, the PC resistance is more excellent.

<Results>

1. As to Large-Current Charging/Discharging Characteristic

As shown in Table 1 above, the large-current charging/discharging characteristic is improved in the Examples in each of which the $WO_3$ was disposed on the surface of the negative electrode active material, as compared with the Comparative Examples not satisfying this condition.

In Comparative Example 2, the electrode resistance is low but the large-current charging/discharging characteristic is low. This is presumably because AB has high electron conductivity but has no lithium ion conductivity.

In Comparative Example 3, the electrode resistance is high. This is presumably because the $Li_3PO_4$ has lithium ion conductivity but has low electron conductivity.

In each of Comparative Examples 4 and 5, the rate characteristic is low. This is presumably because each of the amorphous carbon and the $LiNbO_3$ has low electron conductivity.

From the result of Comparative Example 6, it can be said that a degree of improvement in the large-current charging/discharging characteristic is very small when the $WO_3$ is only dispersed in the negative electrode composite material and is not disposed on the surface of the negative electrode active material.

From the results of Examples 1 and 2, it is understood that the large-current charging/discharging characteristic tends to be improved by heating the composite particles in an oxygen atmosphere. This is presumably because the crystal growth of the $WO_3$ is promoted by the heating.

2. As to PC Resistance

From the results of Examples 3 and 4, it is understood that since the $WO_3$ is disposed in the film-like form on the surface of the negative electrode active material, charging/discharging can be attained even when the PC-based electrolyte solution is used. This is presumably because the $WO_3$ in the film-like form suppresses co-intercalation of the PC. In Example 1 in which the $WO_3$ is in the particulate form, charging to 4.1 V could not be attained. This is presumably because the $WO_3$ in the particulate form cannot suppress co-intercalation of the PC. In each of Comparative Examples 4 and 5, charging/discharging could be attained. However, as described above, the rate characteristic is low in each of Comparative Examples 4 and 5.

Although the embodiments have been described, the embodiments disclosed herein are illustrative and non-restrictive in any respect. The technical scope indicated by the claims is intended to include any modifications within the scope and meaning equivalent to the terms of the claims.

What is claimed is:

1. A lithium ion secondary battery comprising:
   a negative electrode;
   a positive electrode; and
   a non-aqueous electrolyte solution,
   the non-aqueous electrolyte solution including a lithium salt and an aprotic solvent,
   the negative electrode including a composite particle,
   the composite particle consisting of a negative electrode active material and tungsten trioxide,
   the negative electrode active material containing graphite,
   the tungsten trioxide being disposed on a surface of the negative electrode active material, and
   the negative electrode active material and the tungsten trioxide being combined with each other.

2. The lithium ion secondary battery according to claim 1, wherein
   the tungsten trioxide is disposed in a film-like form on the surface of the negative electrode active material,
   the aprotic solvent contains propylene carbonate, and
   the propylene carbonate has a maximum volume ratio in the aprotic solvent.

3. The lithium ion secondary battery according to claim 2, wherein the propylene carbonate has a volume ratio of more than 33 volume % and 50 volume % or less with respect to the aprotic solvent.

4. The lithium ion secondary battery according to claim 2, wherein
   the aprotic solvent further contains ethylene carbonate, and
   the ethylene carbonate has a volume ratio of more than 0 volume % and 33 volume % or less with respect to the aprotic solvent.

5. The lithium ion secondary battery according to claim 3, wherein
   the aprotic solvent further contains ethylene carbonate, and
   the ethylene carbonate has a volume ratio of more than 0 volume % and 33 volume % or less with respect to the aprotic solvent.

6. The lithium ion secondary battery according to claim 1, wherein the tungsten trioxide is in direct contact with the surface of the negative electrode active material.

7. The lithium ion secondary battery according to claim 1, wherein the tungsten trioxide is synthesized on a surface of the negative electrode active material.

8. The lithium ion secondary battery according to claim 1, wherein the tungsten trioxide is synthesized on a surface of the negative electrode active material by a hydrothermal synthesis method.

9. The lithium ion secondary battery according to claim 1, wherein the negative electrode active material consists of spheroidized graphite.

10. The lithium ion secondary battery according to claim 1, wherein the negative electrode active material consists of spheroidized natural graphite.

* * * * *